Nov. 15, 1960    I. BROWNING ET AL    2,960,603
POINT LIGHT SOURCE

Filed March 4, 1957    2 Sheets-Sheet 1

INVENTORS
IBEN BROWNING
JOHN V. ROBINSON
BY
Beau, Brooks, Buckley + Beau.
ATTORNEYS Nov. 15, 1960

I. BROWNING ET AL 2,960,603

POINT LIGHT SOURCE

Filed March 4, 1957

INVENTORS
IBEN BROWNING
JOHN V. ROBINSON
BY
Beau, Brooks, Buckley & Beau.
ATTORNEYS

United States Patent Office 2,960,603
Patented Nov. 15, 1960

2,960,603
POINT LIGHT SOURCE

Iben Browning, Tonawanda, and John V. Robinson, Kenmore, N.Y., assignors, by mesne assignments, to Bell Aerospace Corporation, Wheatfield, N.Y., a corporation of Delaware Filed Mar. 4, 1957, Ser. No. 643,575

6 Claims. (Cl. 240—41)

This invention relates generally to the art of illumination, and more particularly to new and useful means for providing a point light source.

There are many instances wherein a light source of extremely small size, to comprise in effect a point source, is highly desirable. For example, in shadow projection work it has been found that a light source of greater intensity and reduced size, compared to normally available sources such as for example concentrated arc lamps, will result in far better resolution and definition.

Accordingly, it is an object of this invention to provide means for producing an apparent point light source from a real source of considerably greater size and lesser intrinsic intensity. Often the field of illumination produced by such a point source is not adequate for the intended purpose.

Accordingly, it is also an object of this invention to provide means for spreading the solid angle of light emission from such a point source.

Still another object of this invention is to provide the foregoing in an optical device which is relatively simple and inexpensive, while being highly durable and dependable, and which is readily usable for a wide variety of optical purposes.

A point light source spreading device constructed in accord with this invention is characterized, in one aspect thereof, by the provision, in combination with a light source, such as a concentrated arc lamp, of focusing and condensing optical elements arranged in series to focus rays of light emanating from the source to a focal point comprising an apparent light source of point size.

The foregoing and other objects, advantages and characterizing features of a point light source mechanism constructed in accord with this invention will become readily apparent from the ensuing detailed description of certain embodiments thereof, considered in conjunction with the accompanying drawings forming a part hereof wherein.

Referring now to the accompanying drawing, the point light source mechanism of this invention is designed for use in conjunction with a light source, generally designated 1, such as for example an Osram mercury vapor arc lamp or a zirconium arc lamp which will have an appropriate power supply, cooling means and the like, not illustrated. The light emitting arc is represented at 2, and while it is both concentrated and intense, it is desired to provide a much smaller apparent source, of greater intensity.

Figure 1:
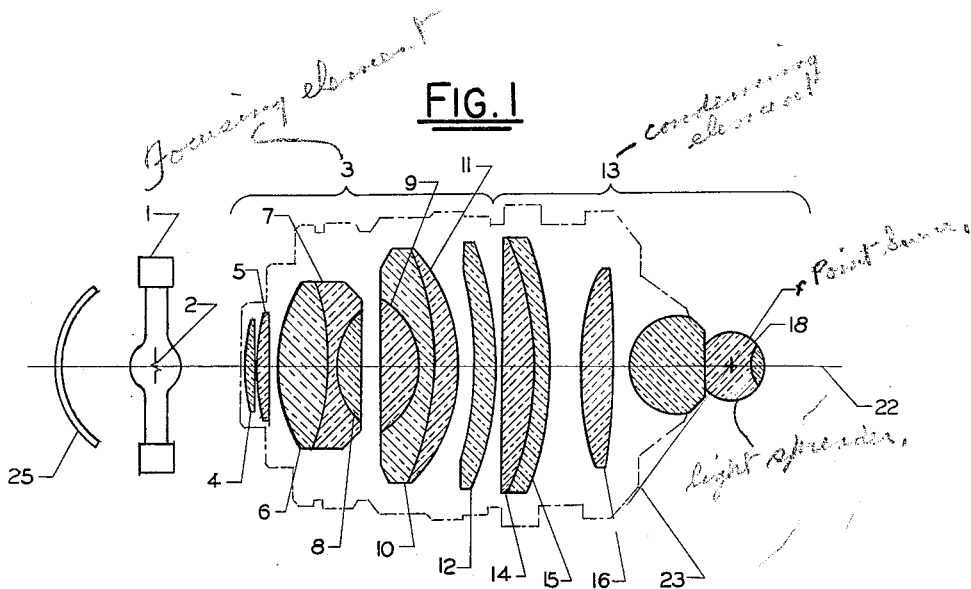
Fig. 1 is a generally schematic, side elevational view of a presently preferred form of point light source producing means constructed in accord with this invention, showing one form of spreading means therefor.
Figure 2:
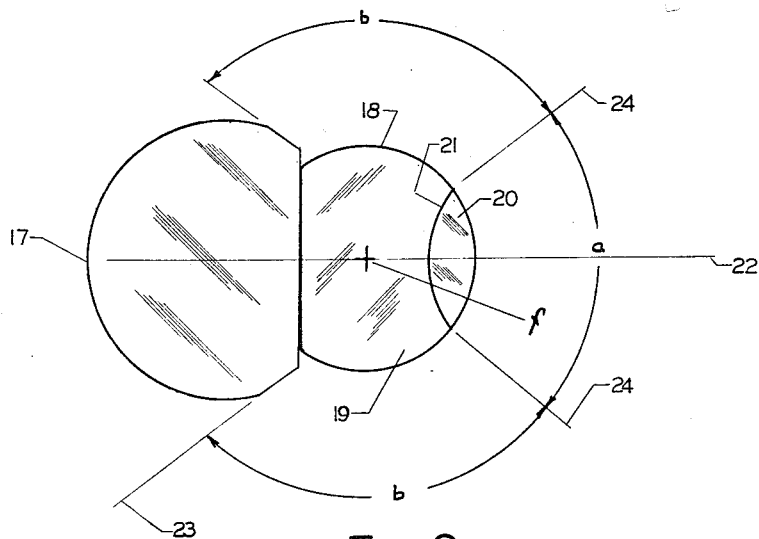
Fig. 2 is an enlarged, generally schematic fragmentary view of the light spreading device of Fig. 1.

To this end, in accord with the invention a focusing element, generally designated 3 is positioned in front of source 1 and comprises, in the illustrated embodiment, a series of nine-anti-reflection coated, color corrected optical elements 4–12, all of known type and design. A condensing element, generally designated 13 and comprising for example a series of wide angle, aplanatic and achromatic optical elements 14, 15, 16 and 17, is positioned in front of focusing element 3. Elements 3 and 13 are selected and arranged so that rays of light emanating from arc 2 of source 1 are focused at a point $f$ which, in Figs. 1 and 2, is contained in a dispersing element, generally designated 18, positioned in front of condensing element 13 and comprising a light spreading device of the invention.

In this way, an apparent light source of greatly reduced size is produced at point $f$, in a relatively simple and inexpensive manner. For example, with a light source 2 having a diameter of 0.187", an apparent source is produced at $f$ having a diameter on the order of 0.005" with a corresponding increase in brilliancy such as to exceed that of the sun. Conventional, stock optical elements can be used, with element 3 comprising, for example, a camera lens having an $f$ number calculated to include the solid angle of light emission from source 2 necessary to produce the desired candlepower and distribution, which angle can be solved using the emission pattern of the source.

Element 13, for example, also can comprise a camera lens, or a microscope condenser, being designed to focus parallel light achromatically to point $f$. Element 13 has a short focal length compared to that of element 3.

Of course, an intermittent, spark source can be used in place of source 1, whereby the demagnifier of this invention can meet nearly all optical requirements.

Mirror 25 reflects rearwardly emitted light through focusing element 3, and preferably is situated slightly off center to reflect the image of one of the incandescent electrodes, not shown, back onto the bright line emitting gas. Thus, the reflected light is focused between the electrodes, so that the increase of heat will not melt them.

It will be appreciated that the demagnification means alone will produce a field of illumination limited to a plane angle of 180°. In accord with this invention, further means can be provided for increasing the field angle, as follows.

Spreading device 18 is of semi-spherical form to provide a spheroidal outer surface which, in accord with the invention, includes the solid angle of the desired field of illumination and has the point $f$ as its center. Further in accord with the invention, device 18 is a compound lens comprising a major body part or lens element 19 recessed in its front face to accommodate a second body part or lens element 20 having the same index of refraction, and the lens elements 19 and 20 are separated along the juncture therebetween by a semireflective coating 21 designed to pass a portion only of the light rays emitted from the apparent source $f$ and striking coating 21 and to reflect the remainder thereof. Lens element 20 is a symmetrical double convex lens, whereby the juncture between elements 19 and 20 is a spheroidal surface on the same radius as the spheroidal outer surface of the compound lens 18, and element 20 is positioned in element 19 so that reflective coating 21 is tangent to the extreme rays 24 of light emitted from the apparent source $f$, defining the maximum cone of emitted light whereby point $f$ and the periphery of lens element 20 define such maximum cone.

Therefore, all of the light rays emitted from point $f$ strike coating 21. A portion of such rays, illustrated at 22, are transmitted through coating 21 and lens element 20 to comprise the forward portion of the field of illumination, denoted by the arc $a$, and the remainder of such rays, illustrated at 23, are reflected by coating 21 through element 19 to comprise the rearward portion of the field of illumination denoted $b$ with the two portions merging along the lines 24 so that there is provided an extremely large solid angle of illumination denoted by the arcs $a+2b$.

Thus, there is provided by this invention means for enlarging the solid angle of the field of illumination of a point source from the relatively narrow angle of emitted light, to a relatively wide angle denoted by arcs $a+2b$, using a combination of direct and reflected light. By using a coating 21 which is approximately fifty percent light reflective, positioned so as to be tangent to the extreme rays 24 of emitted light, the light from source $f$ is uniformly distributed throughout the enlarged field which can have a solid angle perhaps as great as 3 steradians or more.

Coating 21 is of any suitable, highly specular material, and where uniform distribution of light is not desired, the pattern of distribution can be varied by varying the reflectivity thereof to pass either more or less light than is reflected thereby.

The distribution pattern also can be varied by providing a juncture between parts 19 and 20 of non spherical form, or spherical but on a different radius.

Figure 6:
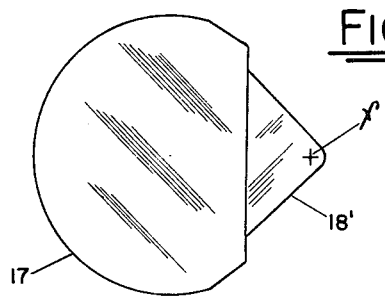
Fig. 6 is a view similar to Fig. 2, but showing a different form of spreading device.

Also, the pattern of light "emitted" from point $f$ can be varied by using a spreading element of different design, such as element 18' in Fig. 6 Here the spreading device comprises a generally conical element, containing the point $f$, and produces a narrower angle, straight beam.

Figure 3:
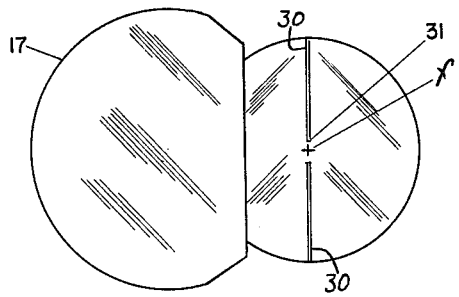
Fig. 3 is a view similar to Fig. 2, but showing a masking element in the light spreading device.
Figure 4:
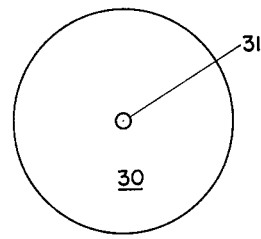
Fig. 4 is a plan view of the masking element of Fig. 3.

The light beam from point source $f$ also can be varied and shaped by masking means, such as element 30 in Figs. 3 and 4. Masking element 30 is contained in spreading element 18, and has a pin hole 31 positioned at point $f$. Mask 30 not only shapes the light beam, but also eliminates peripheral intermediate intensity light such as results when source 1 is operated above its rated wattage to a point where elements adjacent arc 2 become incandescent.

Figure 5:
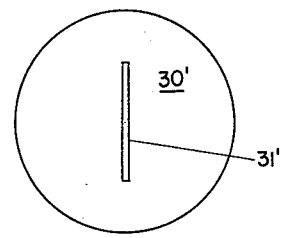
Fig. 5 is a view similar to Fig. 4, but of a different form of masking element.

The mask opening can be made in any shape, as required. Fig. 5 shows a mask 30' having an elongated, slot type of opening 31'.

Figure 7:
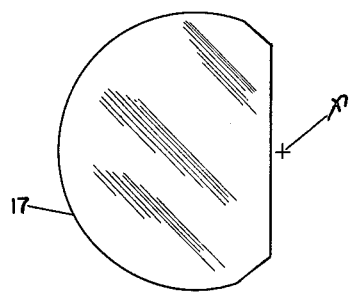
Fig. 7 is a view similar to Figs. 2 and 6, but without a light spreading device.

Fig. 7 shows the demagnifier without a spreading element, with the high intensity point source $f$ in the space occupied by air or other medium of the desired index of refraction ahead of element 17 and radiating in all forward directions within the envelope of illumination. Of course, a masking element, such as 30, 30' or others, can be used in conjunction with point source $f$ without a spreading element.

While only certain presently preferred embodiments are disclosed in detail herein, this invention is not necessarily limited thereto and it is intended that the invention be defined by the scope of the appended claims.

Having fully disclosed and completely described this invention, and its mode of operation, what is claimed as new is as follows:

1. A point light source and light spreading means therefor comprising, in combination with a source of illumination and demagnification means focusing light rays emitted therefrom at a predetermined point, light spreading means for achieving a predetermined field of illumination comprising a light transmitting lens positioned to receive light rays from said demagnification means and having a spheroidal surface including the solid angle of said field centered at said point, said lens comprising a first body part containing said point and having in its front face a recess centered with respect to said field and a mating second body part having the same index of refraction as said first part fitted in said recess, and a semi-reflective coating of highly specular material along the juncture between said first and second parts, whereby substantially one-half of the light rays received by said lens elements from and striking said coating are transmitted therethrough and through said second part and the remainder thereof are reflected by said coating through said first part.

2. In a projection system, the combination with a source of light and means focusing the same at a predetermined point, of a wide angle light transmitting element for spreading light rays from said point through a field of illumination comprising, a multi-part lens having a spheroidal surface centered at said point and including the solid angle of said field, one part of said lens providing a portion of said surface and having a recess receiving a second lens part providing the remainder of said surface, said recess having a concave curvature of the same radius as said surface and the juncture between said lens parts being partly light reflective, whereby a portion of the light passing through said point to said juncture is transmitted therethrough and through said other lens part into a portion of said field and the remainder of such light is reflected from said juncture through said one lens part into another portion of said field.

3. A point light source and light spreading means therefor comprising, in combination with a source of illumination and means focusing light rays emitted therefrom at a predetermined point, means for spreading light rays from said point into a predetermined field of illumination comprising a lens having a spheroidal surface encompassing the solid angle of said field and having its center substantially at said point, said lens element having one body portion centered with respect to said field and providing the central portion of said surface and another body portion providing the remainder of said surface, the juncture between said portions being partly light reflective, the juncture between said body portions being tangent to the periphery of the cone of light rays emitted from said point, whereby the central portion of said field comprises light rays from said point transmitted through said juncture and said one body portion and the rest of said field merges therewith and comprises light rays reflected from said juncture through said other body portion.

4. A light spreading device for use in conjunction with a point light source comprising, a compound lens having a spheroidal surface encompassing the desired field of illumination and having the point light source as its center, said lens comprising a first lens element and a second lens element together providing said spheroidal surface, the juncture between said first and second lens parts being partly light reflective whereby a portion of the light rays from said point striking said juncture will pass therethrough and through said second lens element to provide a portion of said field and the remainder of such light rays will be reflected from said juncture through said one lens element to comprise another portion of said field.

5. A device as set forth in claim 4, wherein said second lens element is of symmetrical double convex form centered with respect to said field, and said juncture is substantially fifty percent light reflective.

6. A point light source and light spreading means therefor comprising, in combination with a source of illumination and means focusing light rays emitted therefrom at a predetermined point, means for spreading light rays from said point into a predetermined field of illumination comprising a compound lens having a spheroidal surface encompassing the solid angle of said field and having its center substantially at said point, said lens having one element providing a portion of said surface and another element providing the remainder of said surface, the juncture between said elements being partly light reflective to pass part of the light striking the same into said one element and reflect the rest of such light through said other element, whereby part of said field comprises light rays transmitted through said juncture and said one element and another part of said field comprises light rays reflected from said juncture through said other element.

References Cited in the file of this patent

UNITED STATES PATENTS

| | | |
|---|---|---|
| 1,312,374 | White | Aug. 5, 1919 |
| 1,615,674 | Beechlyn | Jan. 25, 1927 |
| 1,756,785 | Gallasch | Apr. 29, 1930 |
| 1,952,268 | Luboshez | Mar. 27, 1934 |
| 2,404,476 | Early | July 23, 1946 |
| 2,453,118 | Buckingham et al. | Nov. 9, 1948 |
| 2,481,988 | Early | Sept. 13, 1949 |
| 2,544,213 | Bouwers | Mar. 6, 1951 |
| 2,682,195 | Kauffman | June 29, 1954 |